Patented June 29, 1948

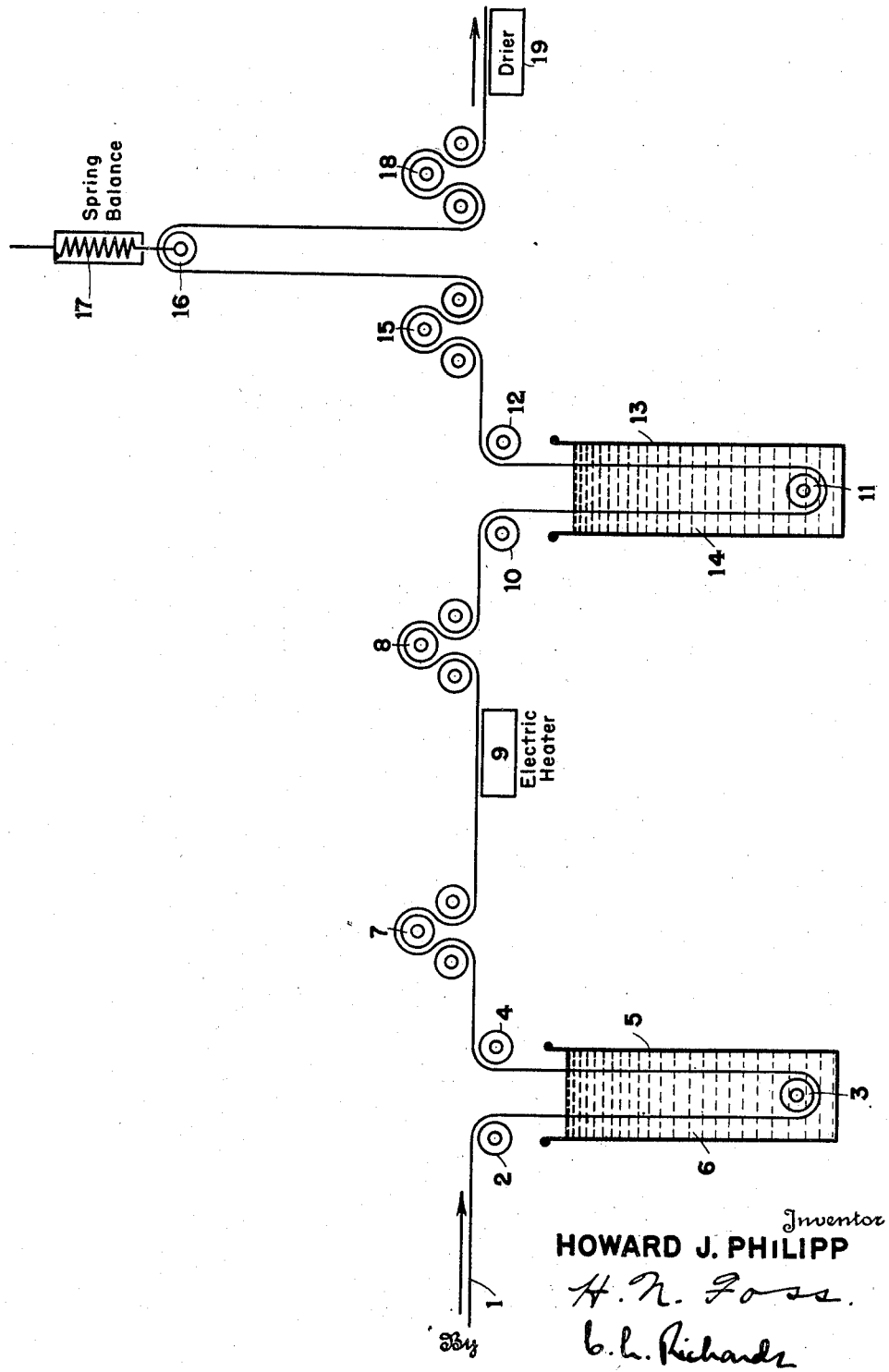

2,444,064

UNITED STATES PATENT OFFICE 2,444,064

METHOD OF TREATING TIRE CORD

Howard J. Philipp, New Orleans, La., assignor to United States of America as represented by Claude R. Wickard, Secretary of Agriculture, and his successors in office Application May 5, 1944, Serial No. 534,363

3 Claims. (Cl. 28—59.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a novel method of treating cotton cord for use in the carcass of pneumatic tires. The object of this invention is to produce a tire cord which combines high induced strength with any desired elongation.

The term "elongation" is used here in the customary sense, that is, the percent increase in length over the initial length under a specified load. It is a property of the cord which is determined together with the breaking strength on a cord-testing machine which meets the specifications of the American Society for Testing Materials.

The carcass of pneumatic tires consists of a number of layers of rubber-coated cord fabrics. The tire cord used in these fabrics determines to a great extent the service performance and life of the finished tire. The cord is generally made by twisting cotton fibers to form single strands, twisting several single strands together to form a plied yarn, and then twisting several plied yarns to form the tire cord. Of the different properties characterizing tire cord, strength and elastic behavior are among the most important.

Many methods have been suggested and are being used to improve the strength of tire cords. Most of these methods consist of some form of stretching the cord either dry or after passing through a liquid, and some methods also call for the application of heat. Although all these methods result in a lowering of the gage and augmentation of the strength, they all have the disadvantage that the greater the tensile strength obtained by such stretching treatments, the smaller becomes the elongation of the treated cord. The elongation of the tire cord is, however, of greatest importance in the construction of a tire, because if it is too great it allows the tire to "grow" in service, while if it is too small it reduces the impact strength or resistance of the tire; that is, because of the small stretch left in the cord, the tire cannot withstand sudden severe impacts due to obstructions or the irregularities of the road which cause the elastic limit of the cord to be exceeded. In order, therefore, to keep the elongation of the cord at its optimum value, which by many tire manufacturers is considered to be about 6 percent at a load of 10 pounds, it has been necessary to limit the stretching treatments or, what is equivalent, to sacrifice a good part of the potential strength of the cord, that could have been realized if maximum stretch could have been applied.

It is the object of the present invention to overcome this difficulty by treating tire cord in such a way as to give it not only a tensile strength almost fully as high as that obtainable by any stretching method, but also to retain or induce any desired elongation between that of the untreated cord and that obtainable by ordinary stretching treatments. The new method consists of two steps which, however, can be combined to one continuous process. During the first step the tire cord is treated in such a way as to give it the greatest possible strength. During the second step the tire cord treated by the first process is subjected to an additional treatment which, according to the conditions selected, will give it the desired elongation while at the same time maintaining the major portion of the strength obtained during the first step.

As to the first step, it has been found that the greatest possible strength is realized if the cord is moistened with some liquid which allows the cotton to swell, and is then stretched just below the breaking point and simultaneously heated at such temperature as completely to dry the cord, but not damage it. This furnishes a cord of maximum attainable strength but of very low and unsuitable elongation. I have now found that if this cord is then subjected to a second treatment during which the cord is remoistened and stretched without heat at a tension different from the one used during the first phase of the treatment, the strength of the cord remains almost unchanged while the elongation of the cord can be regulated to any desired value up to and in some cases even beyond that of the original untreated cord by varying the amount of tension employed during the second phase of the treatment, as well as by the strength of the swelling agent and the time the cord is exposed to this agent. I have also found that the lower the tension used during the second phase of the treatment, or the greater the strength of the swelling agent, or the longer the time of exposure of the cord to the swelling action, the greater is the resulting elongation at a selected loading. Before winding it on a cone after the second stretching, and while the wet cord is under no tension, it may be dried by heat which gives even greater strength and slightly higher elongation than if the wet cord is wound on a cone and then allowed to dry. However, it is very important that no heat be applied during the stretching phase of the second treatment, because the adjustment of elongation is only possible in the absence of heat.

While the first step of the treatment considers the use of tension and heat on the wet cord in order to obtain great tensile strength, the invention is by no means restricted to this particular method. In fact, the second phase of the treatment which permits the adjustment of the elongation almost without loss of strength can successfully be applied to tire cords subjected to any other pre-stretching treatments, such as stretching of the dry cord, stretching of the wet cord, stretching of the steamed cord, with or without application of heat or any other treatment which tends to increase the strength of tire cord by some form of stretching. During both phases of the treatment, any swelling agent for cotton may be used, although water alone or water containing some wetting agent has been found to be very satisfactory. The stretching treatment can be applied to the cord itself or to the tire cord fabric which is customarily woven from the tire cord with thin threads as fillings. The stretching can be done either by stretching with a certain selected load or by stretching to a certain predetermined increase in length. It is obvious that cord made from any other textile fiber could be subjected to the same treatment, and also that a cord produced according to this novel method may be used in other rubber articles which are reinforced with cord or cord fabric, such as transmission belts.

Any number of machines could be designed to carry out the above-described process. The principle of equipment for such a dual stretching treatment is illustrated in the accompanying drawing. The cord or fabric 1 is passed over rolls 2, 3 and 4, through a container 5 filled with a swelling agent 6, which may be water or water containing some wetting agent to hasten penetration or any liquid which will swell cotton. The wet cord is then passed through the snub rolls 7 and 8, the rolls 8 having the same diameter but turning at a greater speed than 7 or having the same speed but a greater diameter than 7. The speed or diameter of the rolls 8 or both is adjustable so as to stretch the cord just short of the breaking point. Between the rolls 7 and 8, the cord passes over an electric heater 9, or any other heating device, such as hot air, infrared radiation, high frequency drying, and so forth. When the cord leaves the rolls 8 it has a very low elongation but very high tensile strength relative to its original strength. The cord is then passed over rolls 10, 11, and 12, to the snub rolls 15, through a container 13 filled with a swelling agent 14, which may be the same as or different from the swelling agent 6. Next the remoistened cord or fabric is passed over the roll 16, which is suspended from a spring balance 17 to the snub rolls 18, and finally over the drier 19. The snub rolls 18 turn at a higher speed than the rolls 15, and the relative speed of the rolls 15 and 18 is adjusted in such a way as to give a certain predetermined tension which can be measured on the spring balance 17. This tension depends on the particular cord being treated, on the swelling agents used, on the speed at which the cord travels through the machine, and on the elongation desired in the finished product. The proper tension to apply to secure a desirable final elongation at a selected load can easily be determined by a few preliminary tests employing different tensions. The drier 19 may be similar to the heater 9.

As a further illustration of the above-described method of treating tire cord, some experimental results are tabulated below:

Table I

|  | #1 | | | #2 | | | #3 | | |
|---|---|---|---|---|---|---|---|---|---|
|  | a | b | c | a | b | c | a | b | c |
| Gage | 0.0296 | 0.0260 | 0.0266 | 0.0293 | 0.0255 | 0.0253 | 0.0333 | 0.0291 | 0.0295 |
| Yarn Number | 1.52 | 1.69 | 1.67 | 1.53 | 1.71 | 1.68 | 1.12 | 1.27 | 1.27 |
| Bone-Dry Strength | 12.65 | 17.52 | 17.11 | 14.80 | 21.68 | 21.35 | 19.20 | 29.20 | 27.30 |
| Strength, Per Cent Based on Control | 100.0 | 138.5 | 135.3 | 100.0 | 146.5 | 144.2 | 100.0 | 152.0 | 142.2 |
| Elongation at 10 pounds | 9.2 | 5.2 | 6.2 | 9.9 | 4.7 | 6.2 | 10.2 | 4.4 | 6.5 |

In Table I, #1 is a tire cord of 23/4/3 construction, which means that 4 single threads having a yarn number of 23 were twisted together to form a plied yarn and that 3 plied yarns were then twisted together to furnish the final cord. The cotton variety used in making the tire cord #1 was Stoneville 2B having a staple length of $1\frac{1}{16}$ inches. Cord #2 is of the same construction as #1 except that it was made from a cotton variety known as SxP having a staple length of 1½ inches. Cord #3 was made from the cotton variety Wilds 13 having a staple length of $1\frac{1}{16}$ inches and with a 17/4/3 construction. For each of the three tire cords, the figures tabulated in column a represent the untreated cord, those in column b the cord as it may be obtained by known methods of stretching, and those in column c a tire cord treated according to the novel method which is the subject of this invention. The gage is measured in inches; the yarn number is determined by conventional methods under standard conditions of temperature and humidity (70° F., 65 percent relative humidity) and is given in hanks per pound, one hank being equal to 840 yards; the bone-dry strength is measured on a Scott tire cord tester after the cord has been dried at a temperature of 224° F.; and the elongation at 10 pounds is given in percent.

It is apparent from the columns a and c of Table I that this invention makes possible the manufacture of a superior, closely controlled tire cord which combines reduced gage with greatly improved breaking strength and with such elongation at 10 pounds as is found to be best for tire cord. This is a substantial improvement over known methods by which an augmented strength as high as that obtainable by this invention could be obtained only in combination with low elongation, as evidenced by the column b in the above chart, or by which adequate elongation at 10 pounds could only be produced in a tire cord at a great sacrifice in strength, which is shown by Table II.

Table II

| 1 | 2 | 3 | 4 | 5 |
|---|---|---|---|---|
| | Tension Used | Bone-Dry Strength | Per Cent of Control | Elongation at 10 pounds |
| | Pounds | Pounds | Per cent | Per cent |
| Control | | 15.51 | 100.0 | 8.8 |
| Single Stretching | 10½ | 20.80 | 134.0 | 3.9 |
| Do | 8½ | 20.72 | 133.5 | 4.2 |
| Do | 4½ | 17.82 | 114.9 | 4.8 |
| Do | 2½ | 17.35 | 111.8 | 5.1 |
| Do | 1½ | 16.83 | 108.5 | 5.6 |
| New Method | 10½+6½ | 19.85 | 128.0 | 5.7 |
| Do | 10½+3½ | 19.75 | 127.3 | 6.8 |
| Do | 10½+½ | 19.35 | 124.7 | 7.5 |

Table II shows some further experimental results. In these experiments a cotton tire cord of 29/5/3 construction, made from the cotton variety Wilds 13, was used. The untreated control cord had the low strength and high elongation listed in columns 3 and 5 of Table II. When this cord was passed through a swelling liquid and subjected to a tension of 10½ pounds, and to heat, a tire cord of different properties having a bone-dry strength of 20.80 pounds and an elongation at 10 pounds of only 3.9 percent was obtained. The improvement in strength is seen to amount to 34 percent, but the elongation is too low, being only 3.9 percent while approximately 6 percent is preferred. Other samples of the same tire cord were treated in a similar manner but at lower tensions in order to secure a more suitable elongation at 10 pounds. At the low tension of 1½ pounds the strength obtained was 16.83 pounds, and the elongation was 5.6 percent. This strength is only 8.5 percent greater than that of the untreated control cord, and the elongation at 10 pounds which increased as the tension on the cord during treatment was lowered, was still less than the preferred elongation.

When, however, the new method, described above, comprising a first treatment to give a strength of 20.80 pounds and a following stretching and swelling treatment was used, a cord having a bone dry strength of 19.75 to 19.85 pounds was obtained, and the elongation could be controlled by selection of the second tension value so as to give very satisfactory results. As the last three lines of Table II show, any elongation at 10 pounds ranging from 5.7 to 7.5 percent could be obtained by applying the second tension listed in column 2 during the second phase of the process. The strength retained at the maximum elongation shown was still 24.7 percent above that of the control, whereas with the stretching treatment alone only 8.5 percent improvement was realized and the elongation at 10 pounds was still too low. These results demonstrate how easily any desired elongation can be obtained by proper adjustment of the tension during the second phase.

Although the foregoing specification is confined to tire cord only, it is obvious that the new method can also be applied to other cords, yarns, and threads.

Having thus described my invention, I claim:

1. A process of treating cotton cord, which comprises wetting the cotton cord with a swelling agent, subjecting the cotton cord to a tension closely approaching its maximum tensile strength and simultaneously heating it to dryness, whereby the strength of the cotton cord is substantially increased, and then rewetting the cotton cord with a swelling agent and stretching it and, after releasing the tension, drying it, whereby the elongation characteristic of the cord is increased.

2. The process described in claim 1, in which the stretching to increase the elongation is under tension lower than the tension employed to increase the strength.

3. The process described in claim 1, in which the swelling agents are aqueous.

HOWARD J. PHILIPP.

REFERENCES CITED

The following references are of record in the file of this patent:

UNITED STATES PATENTS

| Number | Name | Date |
|---|---|---|
| 1,747,533 | Sessions | Feb. 18, 1930 |
| 1,962,424 | Brownell | June 22, 1934 |
| 2,070,716 | Dreyfus | Feb. 16, 1937 |
| 2,094,005 | Dreyfus | Sept. 28, 1937 |
| 2,103,218 | Gwaltney et al. | Dec. 21, 1937 |
| 2,137,339 | Gwaltney | Nov. 22, 1938 |
| 2,173,997 | Burgeni | Sept. 26, 1939 |
| 2,173,998 | Camp et al. | Sept. 26, 1939 |
| 2,220,958 | Jennings | Nov. 12, 1940 |
| 2,265,273 | Dreyfus | Dec. 9, 1941 |
| 2,398,787 | Hansen et al. | Apr. 23, 1946 |